Oct. 28, 1924.
F. M. KINNARD ET AL
1,513,602
SPREADER
Filed Jan. 3, 1924
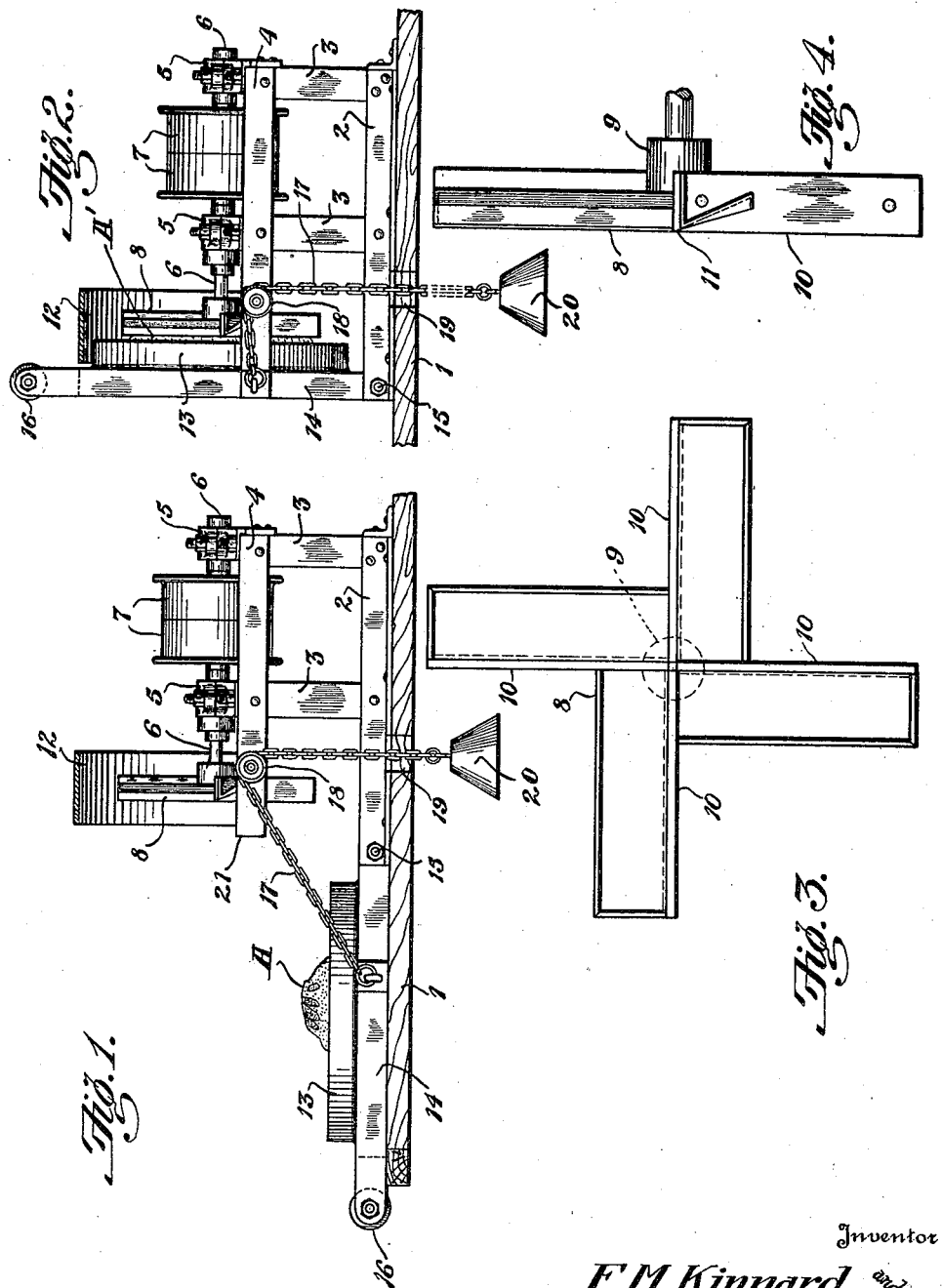
Inventor
F. M. Kinnard. and
R. M. Kinnard.
By Frease and Boyd
Attorneys Patented Oct. 28, 1924.

1,513,602

UNITED STATES PATENT OFFICE.

FRANK M. KINNARD AND ROBERT M. KINNARD, OF SEBRING, OHIO.

SPREADER.

Application filed January 3, 1924. Serial No. 684,164.

*To all whom it may concern:*

Be it known that we, FRANK M. KINNARD and ROBERT M. KINNARD, both citizens of the United States, residing at Sebring, Mahoning County, Ohio, have invented a new and useful Spreader, of which the following is a specification.

This invention relates to spreaders for use in potteries for batting out clay, preparatory to placing the clay in the molds and more particularly to improvements over Letters Patent No. 1,430,309, issued September 26, 1922, to Frank M. Kinnard, and over our co-pending application for spreaders, Ser. No. 649,431, filed July 5, 1923.

The patent and application referred to show spreaders provided with spreader tools arranged to be moved into engagement with a ball of clay placed upon a stationary block. The construction shown in each of these prior cases makes it necessary for the operator to raise and lower a considerable portion of the machine, including the motor, which necessarily requires considerable energy and prevents the maximum speed in operating the spreader.

The object of the present improvement is to provide a spreader tool mounted upon a horizontal shaft journaled in a stationary frame work, the ball of clay being placed upon a block mounted upon a hinged board arranged to be moved upon its hinge to bring the ball of clay into engagement with the spreader tool, a counter balance being provided whereby the hinged board carrying the block is held in the operative or inoperative positions as desired.

The above and other objects may be attained by constructing the machine as illustrated in the accompanying drawing, in which—

Figure 1 is a side elevation of a spreader embodying the invention, showing the same in the initial position;

Fig. 2, a similar view showing the machine in the operative position;

Fig. 3, a front elevation of the spreader tool, and

Fig. 4, an edge elevation of the same.

Similar numerals of reference indicate corresponding parts throughout the drawing.

The machine is mounted upon a table 1 and comprises a frame work 2 secured upon the table in any suitable manner, and including uprights 3 and horizontal members 4 upon which are mounted the bearings 5 through which is journaled a longitudinal shaft 6, having the pulleys 7 thereon, by means of which power may be transmitted to the shaft through a belt.

The spreader tool, indicated generally by the numeral 8, is fixed upon the shaft 6 and comprises the hub 9, having the radially disposed blades 10, each of which has the oppositely disposed lower beveled edge 11.

This spreader tool is preferably of the same form as that shown in our co-pending application, Ser. No. 649,431, above referred to.

A guard plate 12 is preferably connected to the horizontal members 4 of the frame and located around the spreader tool to prevent injury to the operator and also to prevent bits of clay from being thrown outward by the centrifugal force of the rapidly rotating tool.

The block 13 upon which the ball of clay, as shown at A, is placed for forming the bat, is fixed upon a board 14 hinged at its forward end as at 15 to the adjacent end of the frame and arranged to normally lie in horizontal position upon the table as shown in Fig. 1, a handle 16, upon said board, extending over the edge of the table to permit the same to be grasped by the operator.

Flexible members, such as the chains 17, are connected to the board at points spaced from the pivot 15 and extend over the pulleys 18 upon the frame and downward through apertures 19 in the table, counterweights 20 being suspended upon the ends of said chains.

These weights are so proportioned as to just counter balance the board 14 and the block 13 carried thereby, so that in the normal position the board may rest horizontally upon the table.

In operating the machine to form a bat, the ball of clay as shown at A is placed upon the block 13 and the handle 16 is grasped by the operator, the board 14 being tilted upward into vertical position as shown in Fig. 2, moving the ball of clay into engagement with the rotating spreader tool which spreads the same into a flat sheet or cake, such as the bat shown at A', the counterweights 20 holding the board in this position until the bat is properly formed, when the operator again tilts the board back to the horizontal position and removes the bat.

From the above it will be obvious that a very simple and easily operated machine is provided for quickly and accurately forming bats of a uniform thickness and smooth surface. It will also be seen that the machine may be operated very rapidly, as it is only necessary for the operator to place a ball of clay upon the block 13 and tilt the board 14 into vertical position, in which position it may be left while the bat is being formed, the ends 21 of the horizontal members 4 acting as stops to prevent the board from moving beyond the vertical position, thus determining the thickness of the bat.

We claim:

1. A spreader including a rotatable spreader tool mounted upon a horizontal axis, and a movable block arranged to be moved into vertical position adjacent to the spreader tool.

2. A spreader including a rotatable spreader tool mounted upon a horizontal axis, and a movable block arranged to be moved into vertical position adjacent to the spreader tool, and means for temporarily holding the block in vertical position.

3. A spreader including a rotatable spreader tool mounted upon a horizontal axis, and a movable block arranged to be moved into vertical position adjacent to the spreader tool, and means for limiting the movement of the block toward the spreader tool.

4. A spreader including a rotatable spreader tool mounted upon a horizontal axis, and a pivoted block arranged to be moved into vertical position adjacent to the spreader tool.

5. A spreader including a rotatable spreader tool mounted upon a horizontal axis, and a pivoted block arranged to be moved into vertical position adjacent to the spreader tool, and means for limiting the movement of the block toward the spreader tool.

6. A spreader including a rotatable spreader tool mounted upon a horizontal axis, and a pivoted block arranged to be moved into vertical position adjacent to the spreader tool, and means for temporarily holding the block in vertical position.

7. A spreader including a stationary frame, a spreader tool journaled therein upon a horizontal axis, a block pivoted to the frame and arranged to be moved into vertical position adjacent to the spreader tool, and counter balancing means operatively connected to the block for holding the same in either horizontal or vertical position.

In testimony that we claim the above, we have hereunto subscribed our names.

FRANK M. KINNARD.
ROBERT M. KINNARD.